(12) United States Patent
Hyatt et al.

(10) Patent No.: US 10,161,254 B2
(45) Date of Patent: Dec. 25, 2018

(54) STRUCTURAL GUIDE VANE SONIC SHAPE AND INSPECTION

(71) Applicant: United Technologies Corporation, Hartford, CT (US)

(72) Inventors: Thomas B. Hyatt, Cromwell, CT (US); William Richard Ganoe, Jr., Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 622 days.

(21) Appl. No.: 14/773,475

(22) PCT Filed: Oct. 22, 2013

(86) PCT No.: PCT/US2013/066048
§ 371 (c)(1),
(2) Date: Sep. 8, 2015

(87) PCT Pub. No.: WO2014/163667
PCT Pub. Date: Oct. 9, 2014

(65) Prior Publication Data
US 2016/0017729 A1    Jan. 21, 2016

Related U.S. Application Data

(60) Provisional application No. 61/775,972, filed on Mar. 11, 2013.

(51) Int. Cl.
*F01D 9/02* (2006.01)
*B23P 15/04* (2006.01)
(Continued)

(52) U.S. Cl.
CPC ............... *F01D 9/02* (2013.01); *B23P 15/02* (2013.01); *B23P 15/04* (2013.01); *F01D 9/041* (2013.01);
(Continued)

(58) Field of Classification Search
None
See application file for complete search history.

(56) References Cited

U.S. PATENT DOCUMENTS

| | | |
|---|---|---|
| 3,163,942 A | 1/1965 | Rowland |
| 3,832,784 A | 9/1974 | Samuels et al. |

(Continued)

FOREIGN PATENT DOCUMENTS

| | | |
|---|---|---|
| EP | 0199961 A2 | 11/1986 |
| EP | 1734429 A1 | 12/2006 |

(Continued)

OTHER PUBLICATIONS

English translation of JP 2011-122495.*

(Continued)

*Primary Examiner* — Mark Laurenzi
*Assistant Examiner* — Mickey France
(74) *Attorney, Agent, or Firm* — Carlson, Gaskey & Olds, P.C.

(57) ABSTRACT

A method of forming a guide vane is disclosed. The method includes forming a vane blank with sufficient material to fabricate the guide vane in accordance with any one of a plurality of different vane classes. The vane blank is inspected for material inconsistencies, and material is removed from the vane blank to form a desired guide vane in accordance with one of the plurality of vane classes. The inspection process includes disregarding at least one material inconsistency in a region of the vane blank that is removed to form the guide vane.

12 Claims, 4 Drawing Sheets

(51) Int. Cl.
 *F01D 9/04* (2006.01)
 *F01D 25/16* (2006.01)
 *B23P 15/02* (2006.01)
 *G05B 19/4099* (2006.01)

(52) U.S. Cl.
 CPC ........ *F01D 25/162* (2013.01); *F05D 2220/36* (2013.01); *F05D 2230/60* (2013.01); *F05D 2230/61* (2013.01); *F05D 2240/12* (2013.01); *G05B 19/4099* (2013.01); *G05B 2219/45147* (2013.01); *Y02T 50/673* (2013.01)

(56) References Cited

U.S. PATENT DOCUMENTS

| | | | |
|---|---|---|---|
| 5,740,674 | A | 4/1998 | Beutin et al. |
| 6,371,725 | B1 | 4/2002 | Manteiga et al. |
| 8,177,513 | B2 | 5/2012 | Shim et al. |
| 8,221,071 | B2 | 7/2012 | Wojno et al. |
| 8,297,934 | B2 | 10/2012 | Lutz et al. |
| 2008/0072569 | A1 | 3/2008 | Moniz et al. |
| 2008/0159856 | A1 | 7/2008 | Moniz et al. |
| 2010/0074740 | A1 | 3/2010 | Sikorski et al. |

FOREIGN PATENT DOCUMENTS

| | | |
|---|---|---|
| EP | 2333251 A2 | 6/2011 |
| JP | 2011-122495 A | 6/2011 |
| WO | 2011/159437 A1 | 12/2011 |

OTHER PUBLICATIONS

European Search Report for EP Application No. 13881244.1 dated Oct. 24, 2016.
International Preliminary Report on Patentability for International Application No. PCT/US2013/066048 dated Sep. 24, 2015.
International Search Report and Written Opinion for International Application No. PCT/US2013/066048 dated Aug. 27, 2014.

\* cited by examiner

STRUCTURAL GUIDE VANE SONIC SHAPE AND INSPECTION

BACKGROUND

A gas turbine engine typically includes a fan section and a core engine including a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A fan case circumscribes fan blades in the fan section. Structural guide vanes extend radially from the core engine to the fan case and are part of the structure supporting the core engine. Structural guide vanes further include an aerodynamic shape or airfoil that directs airflow to improve propulsive thrust generated from the fan section.

Materials utilized for fabricating a structural guide vane are of a required strength to bear the load of the core engine. Each part is inspected to verify material properties and strength. It is desirable to develop processes for fabricating structural guide vanes in a manner which improves overall yield while identifying undesired material inconsistencies.

SUMMARY

A method of forming a guide vane according to an exemplary embodiment of this disclosure, among other possible things includes forming a vane blank with sufficient material to fabricate the guide vane in accordance with any one of a plurality of different vane classes, inspecting the vane blank for material inconsistences, and removing material from the vane blank to form the guide vane in accordance with a desired one of the plurality of vane classes. Inspecting the vane blank includes defining a first portion of the vane blank in which a material inconsistency is acceptable and a second portion of the vane blank where a material inconsistency is not acceptable.

In a further embodiment of the foregoing method, the step of defining the first portion and the second portion includes defining a plurality of zones within the vane blank and depths within which are permitted material inconsistencies.

In a further embodiment of any of the foregoing methods, material depths are defined within each of the plurality of zones within which material inconsistencies are permitted within the vane blank for a desired one of the plurality of vane classes.

In a further embodiment of any of the foregoing methods, the plurality of zones includes at least three separate zones defined vertically and horizontally within the vane blank.

In a further embodiment of any of the foregoing methods, each of the plurality of zones defines different depths within the vane blank that may include material inconsistencies.

In a further embodiment of any of the foregoing methods, the different depths include a first depth from a surface of the blank within which material inconsistences are acceptable, and a second depth within which material inconsistences are not acceptable, with the second depth being greater than the first depth.

In a further embodiment of any of the foregoing methods, removing material from the vane blank includes machining the vane blank.

In a further embodiment of any of the foregoing methods, the guide vane is formed in accordance with the desired one of the plurality of vane classes includes an airfoil configured and adapted to be operatively positioned between an outer platform mounted to a fan case and an inner platform mounted to a static engine case of a gas turbine engine.

In a further embodiment of any of the foregoing methods, each of the inner platform and the outer platform includes features that maintain a particular desired orientation of the vane.

A guide vane assembly for a gas turbine engine according to an exemplary embodiment of this disclosure, among other possible things includes an outer platform mountable to a fan case of a gas turbine engine, an inner platform mountable to a static engine case of the gas turbine engine, and an airfoil extending between the inner platform and the outer platform. The airfoil is fabricated from a vane blank having sufficient material to fabricate the airfoil in accordance with any one of a plurality of guide vane classes. Each guide vane class corresponds to a different airfoil configuration, and vane blank includes at least one material inconsistency within a region of the vane blank removed to form the airfoil.

In a further embodiment of the foregoing guide vane assembly, each of the inner platform and outer platform includes features that are fabricated to maintain an orientation of the airfoil.

In a further embodiment of any of the foregoing guide vane assemblies, the vane blank includes sufficient material to form the airfoil in accordance with any one of the plurality of guide vane classes.

In a further embodiment of the foregoing structural guide vane, the airfoil is disposed at an angle relative to the inner and outer platforms.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
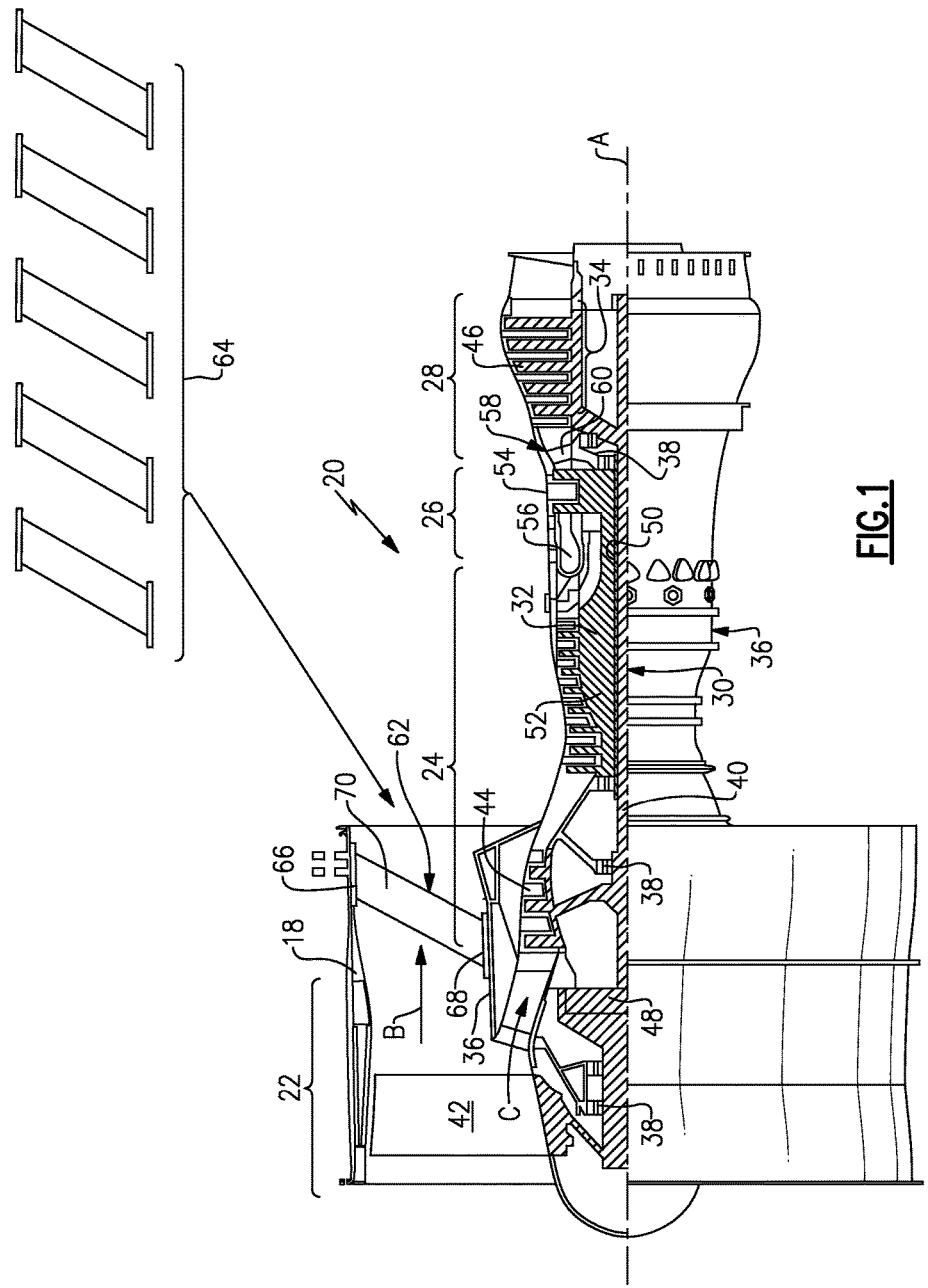
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines. For example, the teachings herein may be utilized in conjunction with a turbine engine having an architecture of low, intermediate, and high spools concentrically rotating about a common axis. In such embodiments, the low spool enables a low pressure turbine to drive a fan via a gearbox, the intermediate spool enables an intermediate pressure turbine to drive a first compressor of the compressor section, and the high spool enables a high pressure turbine to drive a high pressure compressor of the compressor section. Other types of turbine engines may be utilized.

The example engine 20 generally includes a low speed spool 30 and a high speed spool 32 mounted for rotation about an engine's central longitudinal axis 'A' relative to an engine static structure 36 via several bearing systems 38. It will be understood by those skilled in the art that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is derived from a pressure measurement at a location upstream of an inlet of the low pressure turbine 46 and a pressure measurement at the outlet of the low pressure turbine 46 upstream of an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44, compressed by the high pressure compressor 52, mixed with fuel, and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It will be understood, however, that the above parameters are only exemplary of embodiments of a gas turbine engine including a geared architecture, and that the present disclosure is applicable to other gas turbine engines.

A significant amount of thrust is provided by airflow through the bypass flow passage B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(\text{Tram}^\circ \text{ R.})/(518.7^\circ \text{ R.})]^{0.5}$. The "Low corrected fan tip speed", as disclosed herein according to one non-limiting embodiment, is less than about 1150 ft/second.

The example gas turbine engine includes the fan 42, which comprises in one non-limiting embodiment less than about 26 fan blades. In another non-limiting embodiment, the fan section 22 includes less than about 20 fan blades. Moreover, in one disclosed embodiment, the low pressure turbine 46 includes no more than about 6 turbine rotors schematically indicated at 34. In another non-limiting example embodiment, the low pressure turbine 46 includes about 3 turbine rotors. An example ratio between the number of fan blades 42 and the number of low pressure turbine rotors is between about 3.3 and about 8.6. The example low pressure turbine 46 provides the driving power to rotate the fan section 22. Thus, it will be appreciated that the relationship between the number of turbine rotors 34 in the low pressure turbine 46 and the number of blades 42 in the fan section 22 impacts the power transfer efficiency of an example gas turbine engine 20.

A structural guide vane 62 is disposed between a fan case 18 and the engine static structure 36. The structural guide vane 62 includes an airfoil 70 that extends between an outer platform 66 and inner platform 68. The airfoil 70 directs airflow through the bypass flow passage B to avoid obstructions and provide desired airflow characteristics, including aiding in maintaining a desired fan pressure ratio.

Multiple structural guide vanes 62 are provided and are spaced circumferentially within the bypass flow path B. Different regions of the bypass flow path B require airfoils 70 of different configurations to provide the desired airflows in the respective regions. Accordingly, different classes or configurations of the guide vanes 64 (FIG. 2), including differing airfoil geometries (e.g., different cambered airfoil geometries) are utilized. The different classes of guide vanes 64 disposed at different circumferential locations within the bypass flow path B can include a different airfoil shapes and configuration that provide desired properties for that specific location.

Other features of the guide vanes 62 such as the outer platform 66 and the inner platform 68 are common across all of the classes of the guide vanes 64. Each different class or configuration of the guide vanes 64 comprise an individual class that is utilized within the group of guide vanes 62. Accordingly, each of the different classes 64 of guide vanes 62 are tailored to a specific circumferential position within the bypass flow path B and include common features such as the outer and inner platforms 66, 68.

Figure 2:
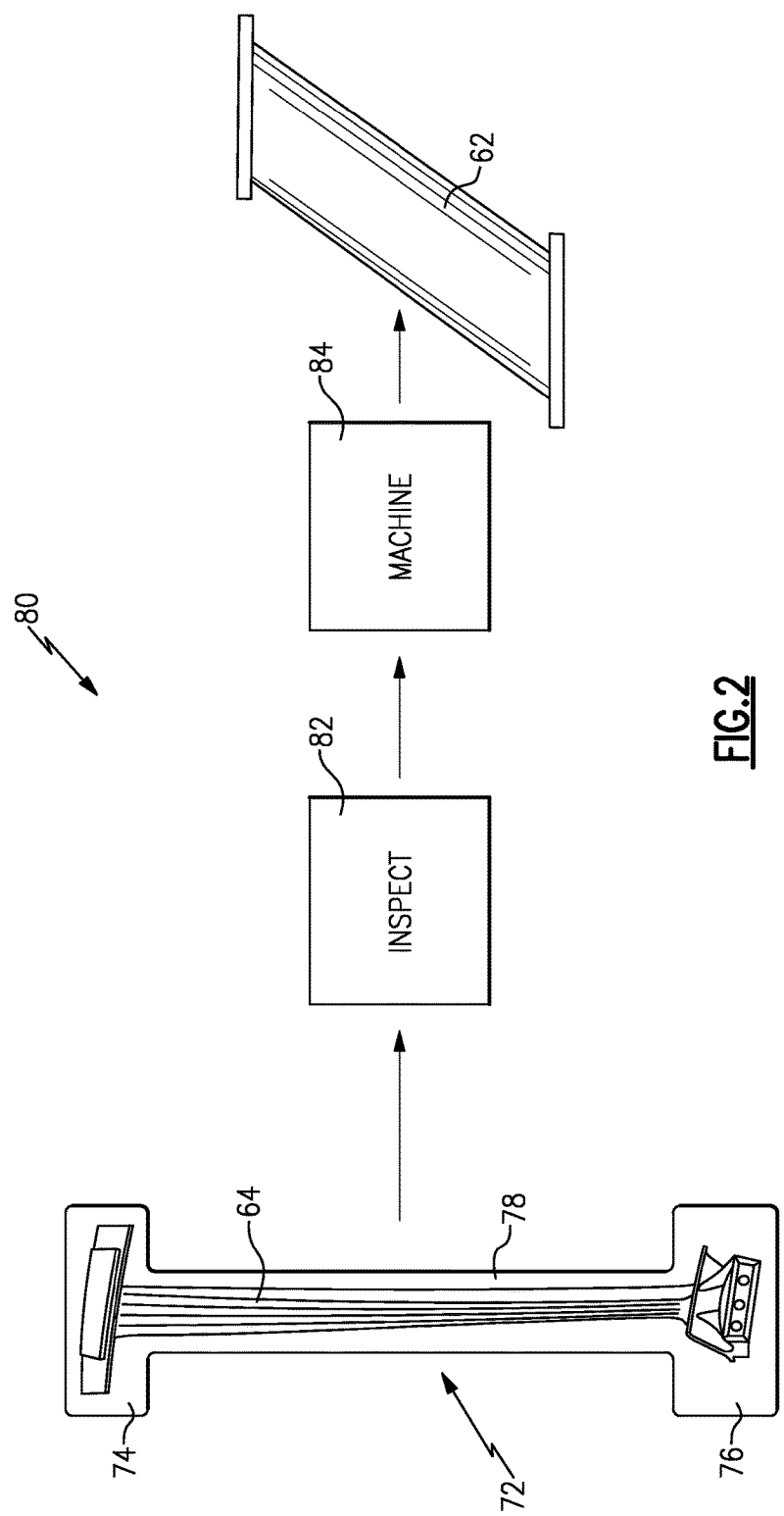
FIG. 2 is a schematic view of an example method of forming a guide vane.

Referring to FIG. 2, the different classes of structural guide vanes 64 are all fabricated beginning with a common vane blank 72. The example vane blank 72 includes sufficient material to accommodate fabrication of any one of the classes of guide vanes 64. In other words, the vane blank 72 includes material sufficient to accommodate fabrication of a guide vane 62 having an airfoil shape corresponding to any one of the plurality of classes of guide vanes 64.

The process for fabricating a single structural guide vane 62 is schematically shown at 80 and begins with the vane blank 72. The vane blank 72 can be formed utilizing any process utilized for constructing a blank of the desired material. In this example the vane blank 72 is formed utilizing an extrusion process, although other known processes are also within the contemplation of this disclosure.

The process of fabricating the vane blank 72 can induce stresses and strains that are detected as material inconsistencies during inspection. The vane blank 72 includes excess material to buffer the core part of the vane blank 72 that forms a portion of a completed structural guide vane 62.

The vane blank 72 is inspected for material inconsistencies as shown at 82. Vane blanks 72 that pass the inspection process are then machined as indicated at 84 using known machining processes to generate the features required of a completed guide vane 62. The example machining process includes removing material to form the desired geometry corresponding to one of the plurality of guide vanes 64 according to the desired class.

It will be appreciated that the vane blank 72 includes a significant amount of material that will be removed during the machining process to form the particular guide vane desired. Material inspection of the entire vane blank 72 typically includes inspection of areas thereof that are to be removed during the machining process 84. The example methodology can account for and disregard areas of inspection that are to be removed during the machining process 84 to achieve the particular class of guide vane 64 desired. In this manner, vane blanks will not be unnecessarily rejected due to material inconsistencies in areas of the blank material that will be removed by machining.

Figure 4:
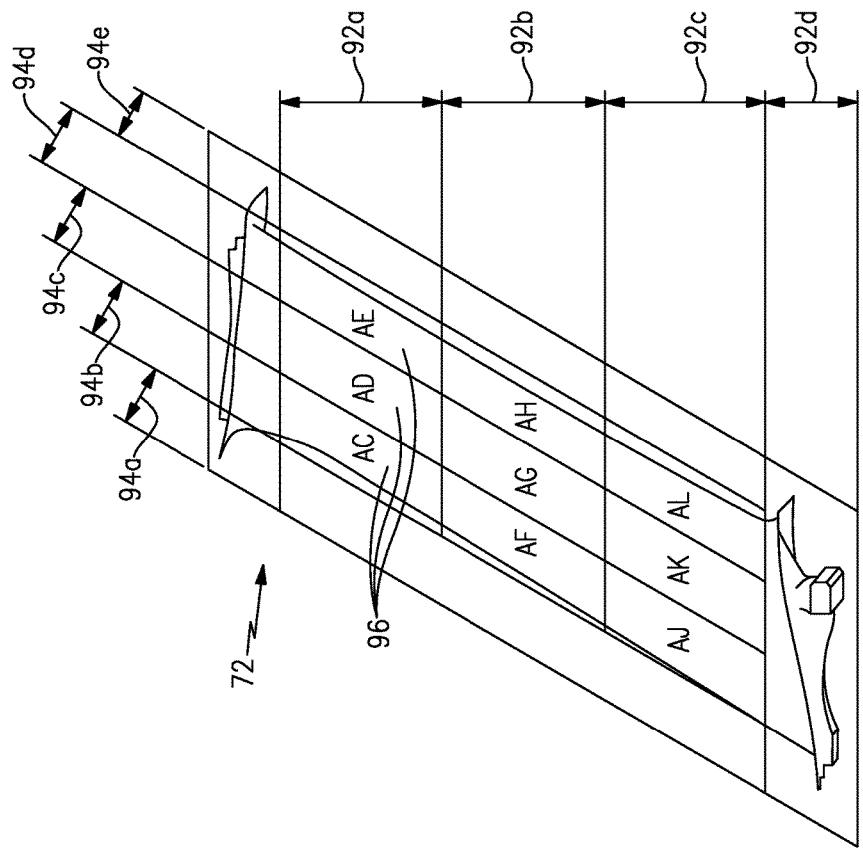
FIG. 4 is a schematic view of inspection zones defined on one side of an example vane blank.
Figure 3:
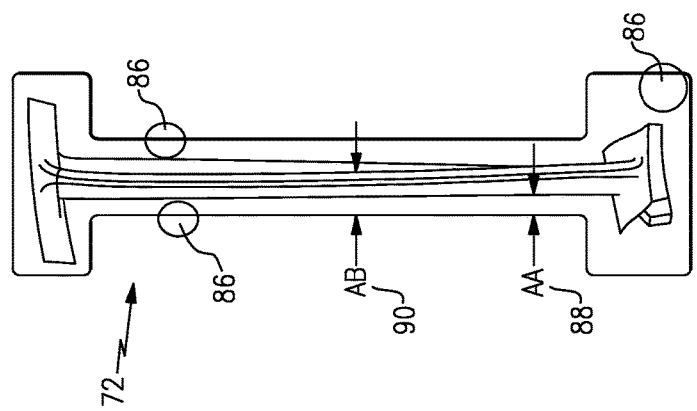
FIG. 3 is a schematic view of a plurality of example vanes superimposed on a vane blank, the vanes falling within a plurality of vane classes.

Referring to FIGS. 3 and 4, the example inspection process 82 accounts for the removal of material during inspection. It will be appreciated that the quantity of excess material corresponding to a particular inspected area, shown schematically at 86, will vary as a function of both the location being inspected on the vane blank 72 and the particular class of vane 64 being fabricated. It will also be appreciated that airfoil geometry varies both from front to rear and top to bottom.

In accordance with the example method, first portion referred to as a first depth 88 and a second portion referred to as a second depth 90 are defined for each of a plurality of zones 96 defined on the vane blank 72. The first depth 88 is a depth from an outer surface of the vane blank 72 over which a detected material inconsistency may be disregarded such that the vane blank 72 is acceptable for use in forming a guide vane 64.

The second depth 90 begins at a surface of the vane blank 72 and extends into the part from the outer surface to a point within the blank corresponding with a surface of a completed vane. Material inconsistences detected within a space between the first depth 88 and the second depth 90 is not acceptable or permitted. Material inconsistencies past the second depth 90 are not considered because inconsistences within this region fall within a region of material that is removed during fabrication.

The first and second depths 88 and 90 are separately defined for each of the plurality of zones 96. The plurality of zones 96 are related to the first and second depths 88, 90 to define regions of excess material that are removed to provide the desired one of the plurality of vane classes.

The plurality of zones 96 are defined by vertical distances 92a-d and horizontal distances 94a-e which together define the zones 96 as regions of a grid overlaid onto the vane blank 72. Each of the plurality of zones 96 includes different first and second depths 88, 90 that define the location within the vane blank 72 where some material defects found during inspection may be disregarded. It will be appreciated that material defects are only disregarded if they do not extend into those regions of the blank 72 from which a completed vane will be fabricated. The first and second depths 88, 90 relate only to areas within the vane blank 72 that will be machined away in accordance with any of the potential classes of the structural guide vane 62.

Figure 5:
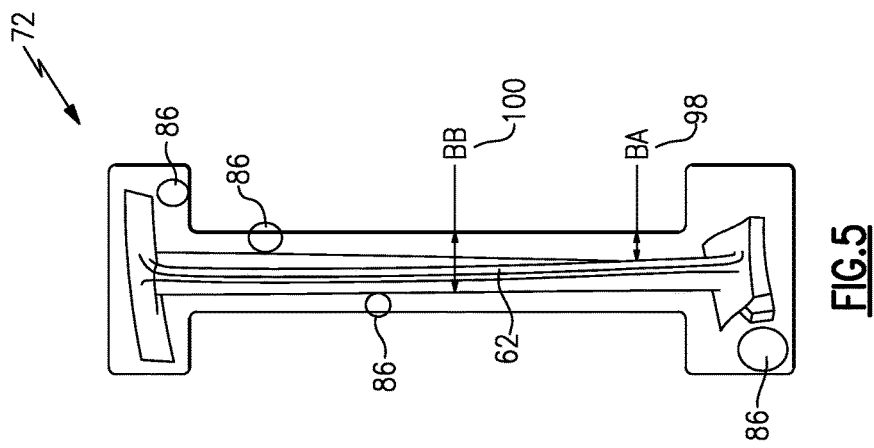
FIG. 5 is a schematic view of example vanes superimposed on a vane blank, the vanes falling within a plurality of vane classes.
Figure 6:
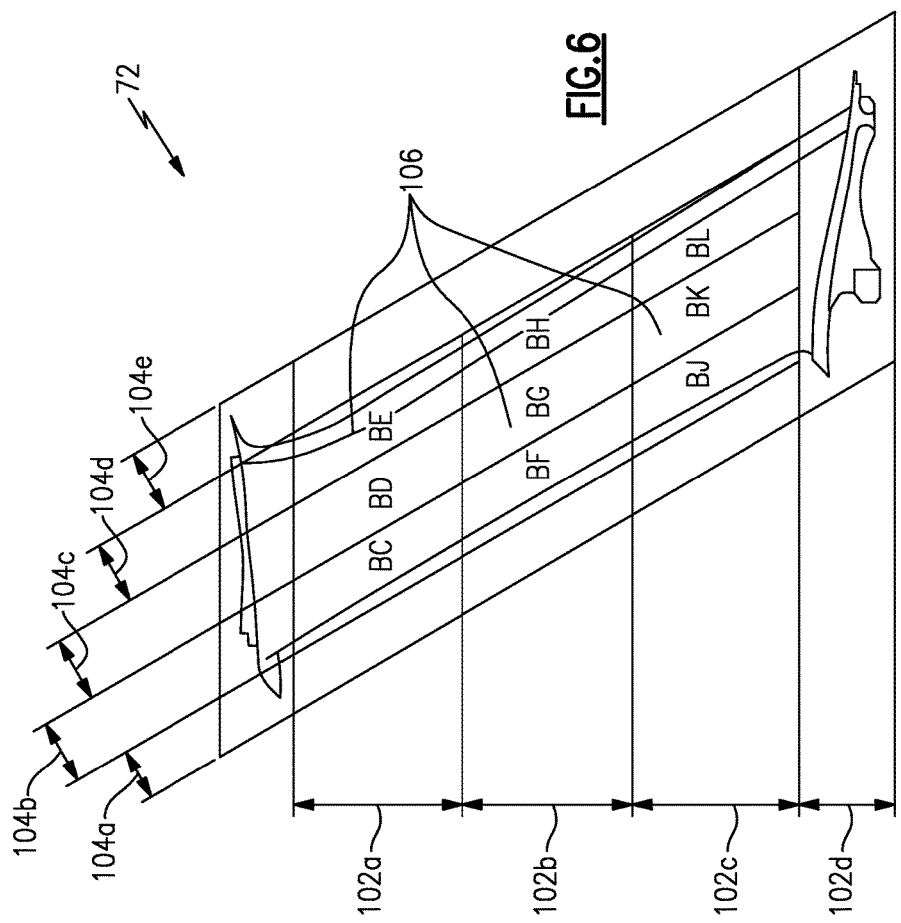
FIG. 6 is a schematic view of inspection zones defined on another side of the example vane blank.

FIGS. 3 and 4 illustrate zones 96 and depths 88 and 90 with regard to an "A" or first side of the vane blank 72. Referring to FIGS. 5 and 6, a "B" side of the vane blank 72 includes a separate first depth 98 and second depth 100 that define thickness from the second or "B" side of the vane blank 72.

Zones 106 are defined by vertical distances 102a-d and horizontal distances 104a-e. The zones 106 are defined in addition to the zones 96 defined on the first or "A" side of the vane blank 72. Inspection of the vane blank 72 utilizing the defined depths 98, 100 in a manner consistent with that discussed above with respect to the first and second depths 88, 90 allows for the acceptance of vane blanks 72 for further fabrication which may contain material inconsistencies in one or more areas that will be eliminated during the machining process.

Accordingly, the example method and inspection process eliminates inspection failures for vane blanks having material inconsistencies in regions or locations thereof that are not part of the completed structural guide vane 62.

Although exemplary embodiments of guide vane structures and methodologies have been disclosed, it will be appreciated that one of ordinary skill in the art would recognize that certain modifications of the guide vane structures and methodologies discussed herein would come within the scope of this disclosure.

What is claimed is:

1. A method of forming a structural guide vane comprising:
   forming a vane blank with sufficient material to accommodate a plurality of different vane classes;
   inspecting the vane blank for material inconsistencies, wherein the vane blank includes material in excess of material required for the plurality of different vane classes;
   accepting the vane blank in response to detection of a material inconsistency within the excess material and rejecting the vane blank in response to detection of a material inconsistency within material not within the excess material; and
   removing material from the vane blank to define a desired one of the plurality of vane classes.

2. The method as recited in claim 1, including defining a plurality of zones within the vane blank that may include material inconsistencies.

3. The method as recited in claim 2, wherein the plurality of zones define regions within the excess material that are removed to provide the desired one of the plurality of vane classes.

4. The method as recited in claim 3, wherein the plurality of zones include at least three vertical zones and at least three horizontal zones.

5. The method as recited in claim 3, wherein each of the plurality of zones defines a range of depths that may include material inconsistencies.

6. The method as recited in claim 5, wherein the range of depths includes a first range comprising a first depth from a surface of the blank that may include material inconsistences and a second range comprising a second depth that may not include inconsistences, with the second depth being greater than the first depth.

7. The method as recited in claim 1, including machining the vane blank to remove material to define the desired one of the plurality of vane classes.

8. The method as recited in claim 1, wherein each of the plurality of vane classes includes an airfoil extending between an inner platform and an outer platform.

9. The method as recited in claim 8, wherein each of the inner platform and the outer platform include features that maintained a desired orientation to the airfoil for each of the plurality of vane classes.

10. A structural guide vane for a gas turbine engine comprising:
    an outer platform mountable to a fan case of a gas turbine engine;
    an inner platform mountable to a static engine case of the gas turbine engine; and
    an airfoil extending between the inner platform and the outer platform, wherein the airfoil is fabricated from a vane blank corresponding to a plurality of vane classes that each defines an airfoil having a different configuration, wherein the vane blank includes material in excess of material required for the plurality of vane classes that defines a buffer to isolate material for the vane from material inconsistencies resulting from forming process.

11. The structural guide vane as recited in claim 10, wherein each of the inner platform and outer platform include features that are fabricated to maintain an orientation to the airfoil for each of the vane classes.

12. The structural guide vane as recited in claim 10, wherein the airfoil is disposed at angle relative to the inner and outer platforms.

* * * * *